Patented Oct. 16, 1951

2,571,121

UNITED STATES PATENT OFFICE 2,571,121

INTERMEDIATE DERIVATIVES OF CERTAIN CARBOXYL-CONTAINING XYLENE-SOLUBLE RESINS

Melvin De Groote, University City, and Bernhard Keiser, Webster Groves, Mo., assignors to Petrolite Corporation, Ltd., Wilmington, Del., a corporation of Delaware No Drawing. Original application February 21, 1950, Serial No. 145,579. Divided and this application August 30, 1950, Serial No. 182,166

15 Claims. (Cl. 260—19)

The present application is concerned with acylation products or intermediates obtained by reaction between (a) a fusible, carboxyl-containing, xylene-soluble, water-insoluble, acid-catalyzed, low-stage phenol-aldehyde resin; said resin being derived by reaction between a mixture of a difunctional monohydric hydrocarbon-substituted phenol and salicylic acid on the one hand, and an aldehyde having not over 8 carbon atoms and reactive towards both components of the mixture on the other hand, the amount of salicylic acid employed in relation to the noncarboxylated phenol being sufficient to contribute at least one salicylic acid radical per resin molecule; said resin being formed in the substantial absence of trifuctional phenols, and said phenol being of the formula

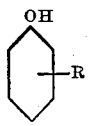

in which R is a hydrocarbon radical having at least 4 and not more than 14 carbon atoms and substituted in the 2,4,6 position; and (b) an acylation-susceptible chemical compound in which the elements are composed exclusively of members selected from the class consisting of carbon, hydrogen, oxygen, nitrogen, sulfur and chlorine, with the proviso that the molecule weight of such second reactant shall not be over 25,000.

Attention is directed to our co-pending application, Serial No. 137,293, filed January 6, 1950. Said application describes a fusible, carboxyl-containing, xylene-soluble, water-insoluble, acid-catalyzed, low-stage phenol-aldehyde resin; said resin being derived by reaction between a mixture of a difunctional monohydric hydrocarbon-substituted phenol and salicylic acid on the one hand, and an aldehyde having not over 8 carbon atoms and reactive towards both components of the mixture on the other hand; the amount of salicylic acid employed in relation to the non-carboxylated phenol being sufficient to contribute at least one salicylic acid radical per resin molecule; said resin being formed in the substantial absence of trifunctional phenols, and said phenol being of the formula

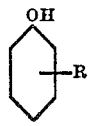

in which R is a hydrocarbon radical having at least 4 and not more than 14 carbon atoms and substituted in the 2,4,6 position. See additionally our co-pending application, Serial No. 8,722, filed February 6, 1948, now Patent 2,499,365, dated March 7, 1950.

The carboxyl-containing xylene-soluble resin of the kind described can be reacted with a variety of compounds reactive towards carboxyl radicals, such as compounds having a hydroxyl radical, an amino radical, an amido radical, a sulfonamide or derivative thereof, or a combination of such radicals or similarly reactive radicals. Such hydroxylated compounds may be composed of carbon, hydrogen and oxygen only or may additionally have some other element, such as nitrogen, sulfur, chlorine, etc. In fact, it is not necessary that oxygen be present, as in the case of an amine or ammonia. Stated another way, such carboxyl may be reactive towards any compound having either a hydroxyl or an amino or nitrogen atom, or both, or other obvious equivalents.

This broad invention is generic to at least three sub-genera. One sub-genus is concerned with acylation-susceptible compounds derived from a carboxyl-containing resin and a second reactant containing carbon, hydrogen and oxygen only.

A second sub-genus of the present invention is concerned with such instances where the acylation-susceptible compounds, either organic or inorganic, contain nitrogen.

A third sub-genus of the broad invention is concerned with certain products of acylation-suscepible organic compounds in which there is present at least one element other than carbon and hydrogen, and either oxygen or nitrogen, or both, said other element being selected from the class consisting of sulfur and chlorine.

The method of preparation of all the compounds within the generic class is essentially the same. The first step is to obtain and prepare a fusible, carboxyl - containing, xylene - soluble, resin and then react the resin with an acylation-susceptible compound of the kind previously described, and particularly an organic compound having a molecular weight under 25,000. The result of such acylation reaction, which may be esterification or amidification, or both, is an acylation product or intermediate of the present invention.

The carboxyl-containing xylene-soluble resins which are acylated to produce the intermediates of the present invention are described in our application Serial No. 137,293, filed January 6, 1950, and reference is made to that application for a complete and full description of these resins and to Examples 6a through 24a thereof for specific examples of suitable resins.

To produce the products of the present application, which are primarily useful as intermediates, these resins of application Serial No. 137,293 are reacted with acylation-susceptible materials reactive with the carboxyl groups present in the resin. In describing the intermediates of the invention, we will first describe acylation with suitable acylation-susceptible materials containing only carbon, hydrogen and oxygen, then acylation with compounds containing nitrogen, and then acylation with compounds containing chlorine or sulfur in addition to carbon and hydrogen, and either oxygen or nitrogen, or both.

COMPOUNDS CONTAINING CARBON, HYDROGEN AND OXYGEN ONLY

These intermediates of the invention are prepared by conventional acylation reactions employing carboxyl-containing xylene-soluble resins described in our said application S. N. 137,293, along with hydroxylated reactants containing carbon, hydrogen and oxygen only. Where the reaction involves a hydroxyl radical free from other interfering radicals as in the case of a monohydric alcohol, polyhydric alcohol, fractional ester, or the like, one can employ any conventional procedure, but the one referred to is a customary esterification reaction employing an acid catalyst. Other obvious equivalents suggest themselves such as reaction with a polyhydric alcohol followed by subsequent reaction with a high molal monocarboxy acid. There is nothing to be gained, however, by employing such added step.

For convenience, we have used a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The selected resin, either dissolved in xylene or with xylene added, was placed in the resin pot along with the selected hydroxylated reactant and a small amount of catalyst, usually para-toluene sulfonic acid. The mixture was refluxed and stirred during the entire procedure.

When the phase-separating trap showed that the amount of water separated was approximately that expected from reaction the operation was stopped. The intermediate so obtained was, of course, dissolved in xylene. The xylene was readily removable by vacuum distillation although for subsequent reaction with an alkylene oxide there is no objection to its presence.

The subsequent tables show the particular resin employed and the amount, the hydroxylated reactant and amount, the amount of catalyst employed (para-toluene sulfonic acid), added solvent and amount, the ratio between available hydroxyls and carboxyls, the approximate reflux temperature, time of refluxing, the amount of water evolved, and the appearance of the final product. The data are in essence self-explanatory.

| Ex. No. | Reactant for Combination with Carboxyl Group | Amt. of Reactant Employed, Grams | Carboxylic Resin,[1] | Amt. of Resin, Grams | Amt. of Acid Catalyst, Grams | Amt. of Solvent, Grams | Ratio of Carboxyl to Hydroxyl | Reflux Temp., °C. | Time in hrs. | Water out, c. c. | Appearance of Solvent Free Ester | Solubility of Solvent Free Ester |
|---|---|---|---|---|---|---|---|---|---|---|---|---|
| 1b | Carbowax 4000 monostearate. | 418 | 7a | 85.5 | 5 | 90.1 | 1:1 | 170 | 4½ | 7.7 | Dk. brown tacky solid. | Wtr.-dispersible foam. |
| 2b | Carbowax 4000 monooleate. | 418 | 7a | 85.5 | 5 | 96 | 1:1 | 174 | 4½ | 10.4 | ...do... | Do. |
| 3b | Ethylene glycol monooleate. | 85.2 | 7a | 228 | 5 | 160 | 1:1 | 168 | 4¾ | 5.9 | ...do... | Do. |
| 4b | Ethylene glycol monostearate. | 89.3 | 7a | 228 | 5 | 160 | 1:2 | 161 | 5¾ | 9.8 | ...do... | Do. |
| 5b | Glycerol mono-oleate. | 93.3 | 7a | 228 | 5 | 197.7 | 1:2 | 153 | 5¾ | 8.6 | ...do... | Do. |
| 6b | Diethylene glycol mono-ricinoleate. | 101 | 7a | 228 | 5 | 157 | 1:1 | 162 | 4 | 7.1 | Dk. brown soft. sol. | Wtr.-dispersible. |
| 7b | Glycerol mono-oleate. | 93 | 7a | 228 | 5 | 152 | 1:1 | 162 | 4 | 7.8 | ...do... | Do. |
| 8b | Glyceryl dioleate. | 162 | 7a | 228 | 5 | 160 | 1:1 | 162 | 4¾ | 6.5 | Dk. brown tacky sol. | Sltly. water dispersible. |
| 9b | Carbowax 4000 monostearate. | 392 | 10a | 75 | 5 | 67.0 | 1:1 | 174–182 | 6 | 10.4 | ...do... | Wtr.-dispersible foams. |
| 10b | Carbox 4000 monooleate. | 392 | 10a | 75 | 5 | 43.0 | 1:1 | 176–182 | 6¼ | 12.0 | Dk. brown Visc, Liq. | Do. |
| 11b | Ethylene glycol diricinoleate. | 162 | 7a | 228 | 5 | 145 | 1:2 | 164 | 4¾ | 8.4 | Tacky solid. | Sltly. water dispersible. |
| 12b | Ethylene glycol diricinoleate. | 152 | 9a | 200 | 5 | 185 | 1:2 | 157 | 4½ | 8.3 | Brittle solid. | Do. |
| 13b | Ethylene glycol diricinoleate. | 145 | 12a | 244 | 5 | 129 | 1:2 | 158 | 5½ | 8.7 | ...do... | Do. |
| 14b | Propylene glycol diricinoleate. | 166 | 7a | 230 | 5 | 146 | 1:2 | 156 | 5½ | 8.8 | ...do... | Do. |
| 15b | Propylene glycol diricinoleate. | 156 | 9a | 200 | 5 | 185 | 1:2 | 159 | 5¾ | 8.5 | ...do... | Do. |
| 16b | Propylene glycol diricinoleate. | 149 | 12a | 245 | 5 | 130 | 1:2 | 160 | 5¾ | 8.2 | ...do... | Do. |
| 17b | Ethylene glycol di(hydroxystearate). | 162 | 7a | 227 | 5 | 145 | 1:2 | 163 | 5¾ | 7.3 | ...do... | Do. |
| 18b | Ethylene glycol di(hydroxystearate). | 152 | 9a | 201 | 5 | 185 | 1:2 | 163 | 6 | 7.6 | ...do... | Do. |
| 19b | Stearic acid ester of ethylene glycol monoricinoleate. | 153 | 7a | 230 | 5 | 150 | 1:1 | 170 | 5¾ | 5.8 | Dk. brown solid. | Insoluble. |
| 20b | Oleic acid ester of ethylene glycol monoricinoleate. | 153 | 8a | 255 | 5 | 171 | 1:1 | 172 | 5½ | 5.7 | ...do... | Do. |

[1] Example number is that of S. N. 137,293.

| Ex. No. | Reactant for Combination with Carboxyl Group | Amt. of Reactant Employed, Grams | Carboxylic Resin,[1] | Amt. of Resin, Grams | Amt. of Acid Catalyst, Grams | Amt. of Solvent, Grams | Ratio of Carboxyl to Hydroxyl | Reflux Temp., °C. | Time in hrs. | Water out, c. c. | Appearance of Solvent Free Ester | Solubility of Solvent Free Ester |
|---|---|---|---|---|---|---|---|---|---|---|---|---|
| 21b | Linoleic acid ester of ethylene glycol monoricinoleate. | 152 | 9a | 215 | 5 | 180 | 1:1 | 168 | 4¾ | 4.9 | Dk. brown solid. | Insoluble. |
| 22b | Oleic acid ester of diethylene glycol monoricinoleate. | 165 | 12a | 240 | 5 | 155 | 1:1 | 165 | 6¼ | 6.0 | ___do___ | Insol. Sltly. tendency to disperse. |
| 23b | Oleic acid ester of diethylene glycol mono-(hydroxystearate). | 165 | 7a | 231 | 5 | 165 | 1:1 | 161 | 5½ | 6.6 | ___do___ | Do. |
| 24b | Oleic acid ester of triethylene glycol monoricinoleate. | 175 | 8a | 257 | 5 | 145 | 1:1 | 163 | 4¼ | 4.8 | Dk. brown tacky solid. | Insol. Def. tendency to disperse. |
| 25b | Octa-decanol | 53 | 7a | 171 | 5 | 200 | 1:1 | 148 | 5½ | 3.0 | Dk. brown brittle solid. | Insoluble. |
| 26b | Dodecanol | 37 | 7a | 171 | 5 | 177 | 1:1 | 149 | 5½ | Over 20 (leak) | ___do___ | Do. |
| 27b | Dodecenol | 53 | 7a | 171 | 5 | 175 | 1:1 | 153 | 5½ | 2.9 | ___do___ | Do. |
| 28b | Octanol | 26 | 7a | 171 | 5 | 179 | 1:1 | 145 | 5½ | 3.6 | ___do___ | Do. |
| 29b | Cetyl alcohol | 63 | 7a | 228 | 5 | 210 | 1:1 | 152 | 6 | 3.1 | ___do___ | Do. |
| 30b | Nonyl alcohol | 38 | 7a | 228 | 5 | 152 | 1:1 | 157 | 5¼ | 3.2 | ___do___ | Do. |
| 31b | Octadecanol | 66 | 9a | 200 | 5 | 205 | 1:1 | 148 | 5¾ | 4.2 | ___do___ | Do. |
| 32b | Dodecanol | 46 | 9a | 200 | 5 | 203 | 1:1 | 148 | 5½ | 4.4 | ___do___ | Do. |
| 33b | Octadecanol | 65 | 9a | 200 | 5 | 196 | 1:1 | 146 | 5¼ | 7.2 | ___do___ | Do. |
| 34b | 2,ethyl butyl alcohol | 25 | 9a | 200 | 5 | 190 | 1:1 | 144 | 6¾ | 5.6 | ___do___ | Do. |
| 35b | Purified octadecanol alcohol. | 66 | 9a | 200 | 5 | 174 | 1:1 | 150 | 6 | 5.5 | ___do___ | Do. |
| 36b | Ricinoleic Acid | 78.0 | 7a | 228 | 5 | 162 | 1:1 | 157 | 4½ | 9.3 | ___do___ | Tends to disperse slightly. |
| 37b | Glycollic | 18.8 | 7a | 228 | 5 | 164 | 1:1 | 148 | 4½ | 7.2 | ___do___ | Do. |
| 38b | Hydroxy decanoic | 49.0 | 7a | 228 | 5 | 151 | 1:1 | 159 | 4½ | 6.6 | ___do___ | Do. |
| 39b | Ricinoleic | 73.1 | 9a | 200 | 5 | 184 | 1:1 | 147 | 4¾ | 7.1 | ___do___ | Do. |
| 40b | Glycollic | 18.7 | 9a | 200 | 5 | 192 | 1:1 | 144 | 4¾ | 7.5 | ___do___ | Insoluble. |
| 41b | Hydroxy decanoic | 71.0 | 9a | 200 | 5 | 371 | 1:1 | 144 | 4¾ | 3.2 | ___do___ | Do. |
| 42b | Ricinoleic | 69.7 | 12a | 244 | 5 | 141 | 1:1 | 150 | 4¾ | 7.3 | ___do___ | Do. |
| 43b | Hydroxy decanoic | 44.0 | 12a | 244 | 5 | 139 | 1:1 | 151 | 3¾ | 4.2 | ___do___ | Do. |
| 44b | Ricinoleic | 55.5 | 8a | 200 | 5 | 144 | 1:1 | 144 | 6½ | 4.0 | ___do___ | Do. |
| 45b | Hydroxy decanoic | 35.0 | 8a | 200 | 5 | 145 | 1:1 | 146 | 6½ | 2.8 | ___do___ | Do. |
| 46b | Ricinoleic | 53.0 | 11a | 200 | 5 | 250 | 1:1 | 253 | 6½ | 3.0 | ___do___ | Do. |
| 47b | Hydroxy decanoic | 34.0 | 11a | 200 | 5 | 253 | 1:1 | 234 | 6½ | 2.0 | ___do___ | Do. |
| 48b | Hydroxy stearic | 99.2 | 7a | 228 | 5 | 160 | 1:1 | 156 | 4 | 7.0 | ___do___ | Do. |
| 49b | Hydroxy stearic | 79.0 | 9a | 200 | 5 | 175 | 1:1 | 149 | 4¾ | 6.8 | ___do___ | Do. |
| 50b | Hydroxy stearic | 71.8 | 12a | 244 | 5 | 173 | 1:1 | 153 | 5¼ | 6.3 | ___do___ | Do. |
| 51b | Hydroxy stearic | 57.0 | 8a | 200 | 5 | 152 | 1:1 | 148 | 6¾ | 3.3 | ___do___ | Do. |
| 52b | Hydroxy stearic | 55.0 | 11a | 200 | 5 | 247 | 1:1 | 239 | 6½ | 3.2 | ___do___ | Very slight tendency to disperse. |
| 53b | P-nonyl cyclohexanol | 44.4 | 7a | 171 | 5 | 188.7 | 1:1 | 150 | 5½ | 4.4 | ___do___ | Do. |
| 54b | Tetrahydrofurfuryl alcohol. | 26.6 | 7a | 228 | 5 | 219.0 | 1:1 | 146 | 5 | 5.2 | ___do___ | Do. |
| 55b | P-phenyl cyclohexanol | 45.9 | 7a | 228 | 5 | 2.4 | 1:1 | 149 | 6 | 5.6 | ___do___ | Do. |
| 56b | Nopol [2] | 43.3 | 7a | 228 | 5 | 155 | 1:1 | 158 | 4½ | 6.8 | ___do___ | Do. |
| 57b | Methylcyclohexanol | 62.1 | 7a | 228 | 5 | 151 | 1:1 | 159 | 4½ | 6.1 | ___do___ | Do. |
| 58b | P-octyl cyclohexanol | 55.4 | 7a | 228 | 5 | 150 | 1:1 | 158 | 4¾ | 6.0 | ___do___ | Do. |
| 59b | P-tertiary amylcyclohexanol. | 44.4 | 7a | 228 | 5 | 148 | 1:1 | 156 | 4¾ | 5.0 | ___do___ | Do. |
| 60b | P-sec.-butyl-cyclohexanol. | 40.8 | 7a | 228 | 5 | 142 | 1:1 | 156 | 4¾ | 5.0 | ___do___ | Do. |
| 61b | 2,4-diamylcyclohexanol | 62.8 | 7a | 228 | 5 | 153 | 1:1 | 159 | 4½ | 5.9 | ___do___ | Do. |
| 62b | Benzyl alcohol | 28.2 | 7a | 228 | 5 | 155 | 1:1 | 159 | 4½ | 7.0 | ___do___ | Do. |
| 63b | P-tert. amyl cyclohexanol. | 41.6 | 9a | 200 | 5 | 195 | 1:1 | 146 | 5¼ | 7.2 | ___do___ | Do. |
| 64b | Menthylcyclohexanol | 58.3 | 9a | 200 | 5 | 183.5 | 1:1 | 150 | 6 | 6.6 | ___do___ | Do. |

[1] Example number is that of S. N. 137,293.
[2] (6,6-dimethylbicyclo-(1,1,3)-hept-2-ene-2-ethanol).

Other esters of the invention are prepared from oxyalkylated derivatives of alkyl phenol-aldehyde resins by reaction with the carboxyl-containing phenol-aldehyde resins.

The alkyl phenol-aldehyde resins which are oxyalkylated to produce suitable acylation-susceptible compounds are prepared from phenols having a hydrocarbon substituent having from 4 to 14 carbon atoms in the 2,4,6 position, and the aldehydes have 8 carbon atoms or less. These products are water-insoluble, xylene-soluble, fusible resins. A large number of them are described in our Patent 2,499,365 and their oxyalkylation to produce suitable acylation-susceptible products is also described in some detail in that patent. We refer specifically to Examples 1a, 3a, 5a, 7a and 8a of that patent for examples of suitable alkyl phenol-aldehyde resins, which on oxyalkylation, give acylation-susceptible compounds suitable for the production of the intermediates of the present application.

The following examples illustrate and describe the oxyalkylated derivatives of such phenol-aldehyde resins:

*Example 1bb*

The reaction vessel employed was a stainless steel autoclave with the usual devices for heating, heat control, stirrer, inlet, outlet, etc., which are conventional in this type of apparatus. The capacity was about 2 gallons. The stirrer was operated at a speed of approximately 250 R. P. M. There were charged into the autoclave 1555 grams of a resin of the kind identified by Example 1x of Patent 2,499,365. This resin was dissolved in 1445 grams of solvent (xylene); 45 grams of sodium methylate were added. The autoclave was sealed, swept with nitrogen gas, and stirring started immediately and heat applied. The temperature was allowed to rise to approximately 145°–150° C. At this point the addition of ethylene oxide was started. It was added continuously at such speed that it was absorbed by the reaction as rapidly as added. The amount of ethylene oxide added was 425 grams. The time required to add this ethylene oxide was one-half hour. During this period of time the temperature was maintained at 145°–150° C., using cooling water through the inner coils when necessary and otherwise applying heat when necessary. The maximum pressure during the reaction was 60 pounds per square inch. The product obtained was water-insoluble.

This oxyalkylated product was further oxyalkylated in two successive steps, resulting in the production of, first, an emulsifiable product and, finally, of a readily water-dispersible or "soluble" product. This is shown in the first 3 lines of the following table.

The other examples recited in the table represent still further examples of the preparation of this oxyalkylated alkylphenol-aldehyde class of reactants.

In column 2 of the table the resins of column 2 designated by an Arabic numeral followed by a lower case "a" are the products of the corresponding examples of Patent 2,499,365, while those designated by an Arabic numeral followed by two lower case "b's" are partially oxyalkylated products identified under "Ex. No." in the first column of the table.

reacted therewith to produce the acylation products which are the intermediates of this invention. The acylation products obtained from such oxyalkylated alkylphenolaldehyde resins by reaction with a carboxyl-containing aldehyde-resin are illustrated by the following table.

The column headed "Carboxylic Reactant" shows by number the carboxyl-containing resin employed in each example, such resins being those described under the same number and letter designations in application S. N. 137,293.

The polyhydric reactant designated "63bb" in the following table is the resin of Example 3a of Patent 2,499,365 oxyethylated with 1750 grams of ethylene oxide to 1760 grams of the resin with 2,000 grams of xylene as solvent, 40 grams of sodium methylate as catalyst, time one hour, maximum temperature 180° C., maximum pressure 100 lbs. per sq. in. It is water soluble.

The polyhydric reactant designated "64bb" in the following table is the resin of Example 8a of Patent 2,499,365 oxyethylated with 1800 grams of ethylene oxide to 1920 grams of resin with 2,000 grams of xylene as solvent, 46.5 grams of sodium methylate as catalyst, time 1¼ hours, maximum temperature 182° C., maximum pressure 105 lbs. per sq. in. It is soluble in water.

The polyhydric reactant designated "65bb" in the following table is a resin obtained following the procedure of Example 1a of Patent 2,499,365, from technically pure nonyl phenol 660 grams, formaldehyde 37% 243 grams, concentrated HCl 9 grams, monoalkyl ($C_{10}$–$C_{20}$, principally $C_{12}$–$C_{14}$) benzene monosulfonic acid sodium salt 2.5 grams, and xylene 300 grams, which resin was oxyethylated with 1825 grams of ethylene oxide to 1975 grams of resin, with 2,000 grams of xylene as solvent, 48 grams of sodium methylate as cata-

| Ex. No. | Derivative No. | Amt. Taken, Gms. (Solvent Free) | Solvent Present, Gms. (Xylene) | Sod. Methylate Added, Gms. | Et.O Added, Gms. | Time (hrs.) | Temp. Max., °C. | Max. Pres., lbs. per sq. inch | Solubility in Water |
|---|---|---|---|---|---|---|---|---|---|
| 1bb | 1a | 1555 | 1445 | 45 | 425 | ½ | 150 | 60 | Insoluble. |
| 2bb | 1bb | 1167 | 848 |  | 1350 | ½ | 188 | 95 | Emulsifiable. |
| 3bb | 2bb | 780 | 265 |  | 1050 | ½ | 170 | 80 | Water Soluble. |
| 4bb | 1a | 518 | 482 | 15 | 1425 | ½ | 183 | 100 | Emulsifiable. |
| 5bb | 1a | 415 | 355 | 15 | 1700 | ½ | 180 | 120 | Water Soluble. |
| 6bb | 1a | 353 | 633 | 15 | 2400 | ½ | 194 | 100 | Do. |
| 7bb | 6bb | 768 | 177 |  | 800 | ½ | 161 | 100 | Do. |
| 8bb | 1a | 223 | 396 | 15 | 1816 | ½ | 192 | 95 | Do. |
| 9bb | 1a | 214 | 382 |  | 2039 | ½ | 171 | 90 | Do. |
| 10bb | 1a | 196 | 349 | 15 | 2650 | ½ | 171 | 80 | Do. |
| 11bb | 1a | 205 | 367 | 15 | 2223 | ½ | 170 | 95 | Do. |
| 12bb | 3a | 1575 | 1425 | 50 | 400 | ½ | 150 | 80 | Insoluble. |
| 13bb | 12bb | 1510 | 1090 |  | 1225 | ½ | 158 | 80 | Emulsifiable. |
| 14bb | 13bb | 1787 | 713 |  | 975 | ½ | 173 | 60 | Water Soluble. |
| 15bb | 14bb | 1490 | 384 |  | 550 | ½ | 160 | 150 | Do. |
| 16bb | 15bb | 964 | 180 |  | 200 | ½ | 150 | 100 | Do. |
| 17bb | 3a | 280 | 533 | 10 | 1742 | ½ | 171 | 95 | Do. |
| 18bb | 3a | 142 | 270 | 10 | 1778 | ½ | 150 | 90 | Do. |
| 19bb | 3a | 183 | 347 | 10 | 2445 | ½ | 205 | 100 | Do. |
| 20bb | 3a | 208 | 396 | 10 | 1571 | ½ | 160 | 75 | Do. |
| 21bb | 3a | 212 | 402 | 10 | 2126 | ½ | 171 | 100 | Do. |
| 22bb | 3a | 227 | 430 | 10 | 1993 | ½ | 194 | 95 | Do. |
| 23bb | 8a | 1580 | 1420 | 50 | 325 | ½ | 150 | 50 | Insoluble. |
| 24bb | 23bb | 1490 | 1110 |  | 1000 | ½ | 171 | 100 | Emulsifiable. |
| 25bb | 24bb | 920 | 410 |  | 1390 | ½ | 172 | 150 | Soluble. |
| 26bb | 8a | 736 | 664 | 25 | 1500 | ½ | 190 | 120 | Do. |
| 27bb | 8a | 490 | 440 | 15 | 1480 | ½ | 160 | 150 | Do. |

Having prepared hydroxylated reactants as just described in Examples 1bb–27bb above, the carboxyl-containing resinous materials are then lyst, time 1½ hours, maximum temperature 181.5° C., maximum pressure 103 lbs. per sq. in. It is water soluble.

| Ex. No. | Ex. No. Polyhydric Reactant | Amt. Used Gms. (Solvent Free) | Carboxylic Resin [1] | Amt. Used Gms. (Solvent Free) | Solvent (Xylene) Gms. | Catalyst (Para-toluene Sulfonic Acid) Gms. | Ratio COOH to OH | Temp., °C. | Time (Hrs.) | Water out |
|---|---|---|---|---|---|---|---|---|---|---|
| 65b | 63bb | 176 | 7a | 107 | 337 | 7 | 1:1 | 150 to 170 | 4 | Approx. theoretical |
| 66b | 63bb | 141 | 7a | 171 | 354 | 7 | 2:1 | 150 to 170 | 4 | Do. |
| 67b | 63bb | 70.4 | 7a | 128 | 359.6 | 7 | 3:1 | 150 to 170 | 4 | Do. |
| 68b | 63bb | 176 | 9a | 100 | 282 | 7 | 1:1 | 150 to 170 | 4 | Do. |
| 69b | 63bb | 141 | 9a | 159.6 | 295.4 | 7 | 2:1 | 150 to 170 | 4 | Do. |
| 70b | 63bb | 70.5 | 9a | 119.7 | 302.3 | 7 | 3:1 | 150 to 170 | 4 | Do. |
| 71b | 63bb | 156.5 | 12a | 113.5 | 312 | 7 | 1:1 | 150 to 170 | 4 | Do. |
| 72b | 63bb | 117 | 12a | 170.5 | 312.5 | 7 | 2:1 | 150 to 170 | 4 | Do. |
| 73b | 63bb | 70.5 | 12a | 153.5 | 262 | 7 | 3:1 | 150 to 170 | 4 | Do. |
| 74b | 63bb | 140.8 | 11a | 112.6 | 297.6 | 7 | 1:1 | 150 to 170 | 4 | Do. |
| 75b | 63bb | 108 | 11a | 173 | 309 | 7 | 2:1 | 150 to 170 | 4 | Do. |
| 76b | 63bb | 70.5 | 11a | 168.5 | 272 | 7 | 3:1 | 150 to 170 | 4 | Do. |
| 77b | 63bb | 156.5 | 8a | 119.5 | 311 | 7 | 1:1 | 150 to 170 | 4 | Do. |
| 78b | 63bb | 117 | 8a | 179.5 | 314.5 | 7 | 2:1 | 150 to 170 | 4 | Do. |
| 79b | 63bb | 70.5 | 8a | 161.5 | 261.8 | 7 | 3:1 | 150 to 170 | 4 | Do. |
| 80b | 64bb | 157.5 | 7a | 101 | 294.5 | 7 | 1.2:1 | 150 to 170 | 4 | Do. |
| 81b | 64bb | 131.5 | 7a | 171 | 328.5 | 7 | 2.4:1 | 150 to 170 | 4 | Do. |
| 82b | 64bb | 83 | 7a | 161.5 | 283.5 | 7 | 3.6:1 | 150 to 170 | 4 | Do. |
| 83b | 64bb | 197 | 9a | 100 | 320 | 7 | 1:1 | 150 to 170 | 4 | Do. |
| 84b | 64bo | 157.5 | 9a | 159.5 | 330 | 7 | 2:1 | 150 to 170 | 4 | Do. |
| 85b | 64bb | 105 | 9a | 160 | 343 | 7 | 3:1 | 150 to 170 | 4 | Do. |
| 86b | 64bb | 175 | 12a | 113.5 | 304.5 | 7 | 1:1 | 150 to 170 | 4 | Do. |
| 87b | 64bb | 131 | 12a | 203 | 328 | 7 | 2:1 | 150 to 170 | 4 | Do. |
| 88b | 64bb | 87.5 | 12a | 170.5 | 275 | 7 | 3:1 | 150 to 170 | 4 | Do. |
| 89b | 65bb | 181.5 | 7a | 95 | 285.5 | 7 | 1:1 | 150 to 170 | 4 | Do. |
| 90b | 65bb | 148.5 | 7a | 160 | 287 | 7 | 2:1 | 150 to 170 | 4 | Do. |
| 91b | 65bb | 109 | 7a | 171 | 270 | 7 | 3:1 | 150 to 170 | 4 | Do. |
| 92b | 65bb | 234 | 9a | 114 | 301 | 7 | 1:1 | 150 to 170 | 4 | Do. |
| 93b | 65bb | 163 | 9a | 159.5 | 247.5 | 7 | 2:1 | 150 to 170 | 4 | Do. |

[1] Example number is that of S. N. 137,293.

Still another class of esters are the esters derived from polyhydric alcohols and the carboxyl-containing phenol-aldehyde resins.

Example 94b

The particular resin employed was the one described under the heading of Example 7a of application S. N. 137,293. The polyhydric alcohol employed was ethylene glycol. The amount of ethylene glycol used was 9.3 grams. The amount of carboxylic resin was 256 grams. The amount of para-toluene sulfonic acid was 5 grams. The amount of solvent (xylene) present was 292 grams. The reflux temperature varied from 150° C. to 170° C. The time of refluxing was 4 hours. The solvent-free product was clear, reddish amber, and soft to tacky in appearance.

The water evolved was separated in a phase-separating trap as previously described. In a large number of similar experiments we have taken particular pains to measure the amount of water evolved. This, however, is not particularly significant, especially where the amount of is 3, 4, 5 or 6 cc. We have found the figure is not significant for a number of reasons: (a) sometimes water formed is simply a fraction of a mole, that times some of the water tends to hang up in the apparatus; (b) sometimes the reactants employed, although not necessarily in the instant case, contain a trace of moisture or some other volatile substance which comes over with the water and the reading appears to be high; (c) sometimes some other reaction, such as etherification, takes place. In this case the reaction was conducted until apparently no more water due to an acylation reaction came over. We have indicated this amount of water as being approximately theoretical which is in accordance with results. The formation of the ester yields a product having different physical characteristics, for instance, a higher molecular weight. It yields a product having different chemical characteristics than the reaction mixture, for instance, a saponification number. Similarly, the acid value or hydroxyl value of the finished reaction mass is different from that of the unreacted initial mixture.

The following table illustrates and describes this and other ester intermediates.

| Ex. No. | Reactant for Combination with Carboxyl Group | Amt. of Reactant Employed, Grams | Carboxylic Resin [1] | Amt. of Resin, Grams | Amt. of Acid Catalyst (P.T.S.*), Grams | Amt. of Solvent (Xylene), Grams | Ratio of Carboxyl to Hydroxyl | Reflux Temp., °C. | Time in hrs. | Appearance of Solvent Free Ester |
|---|---|---|---|---|---|---|---|---|---|---|
| 94b | Ethylene glycol | 9.3 | 7a | 256 | 5 | 292 | 2:1 | 150° C. to 170° C. | 4 | Clear, reddish amber soft to tacky. |
| 95b | Propylene glycol | 11.4 | 7a | 256 | 5 | 292 | 2:1 | 150° C. to 170° C. | 4 | Clear, reddish amber soft to semi-fluid. |
| 96b | Glycerol | 13.8 | 7a | 256 | 5 | 292 | 2:1 | 150° C. to 170° C. | 4 | Clear, reddish amber soft to semi-pliable. |
| 97b | do | 9.2 | 7a | 256 | 5 | 292 | 3:1 | 150° C. to 170° C. | 4 | Reddish, black, hard brittle. |
| 98b | Diglycerol | 44 | 7a | 211 | 5 | 259 | 1:1 | 150° C. to 170° C. | 4 | Reddish amber, semi-soft to pliable. |
| 99b | do | 22 | 7a | 213 | 5 | 261 | 2:1 | 150° C. to 170° C. | 4 | Reddish black hard and brittle. |
| 100b | do | 17.6 | 7a | 257.4 | 5 | 294.6 | 3:1 | 150° C. to 170° C. | 4 | Reddish amber hard and brittle. |
| 101b | Sorbitol | 54.6 | 7a | 268 | 5 | 299 | 1.04:1 | 150° C. to 170° C. | 4 | Do. |
| 102b | do | 27.3 | 7a | 266 | 5 | 300 | 2.08:1 | 150° C. to 170° C. | 4 | Do. |
| 103b | do | 18 | 7a | 256 | 5 | 292 | 3:1 | 150° C. to 170° C. | 4 | Do. |
| 104b | Tetramethylol cyclohexanol | 33 | 7a | 256 | 5 | 292 | 2:1 | 150° C. to 170° C. | 4 | Do. |
| 105b | Propylene glycol | 304 | 7a | 128 | 7 | 197 | 1:1 | 150° C. to 170° C. | 4 | Dk. amber slightly opaque; soft, fluid. |

[1] Example number is that of S. N. 137,293.

Further examples of acylation products which are included among the intermediates of the present invention are products of high molecular weight obtained in various ways as, for example, the oxyethylation or oxypropylation of heat-stable carbohydrates, including mannitan, sorbitol, etc. For example, sucrose can be treated with an alkylene oxide (ethylene oxide or propylene oxide) in a ratio of 100 moles of oxide for each initial hydroxyl radical. Thus the molecular weight of such polyhydric alcohols may vary from ethylene glycol (62) to compounds whose molecular weights are in the neighborhood of 25,000.

We prefer that the hydroxylated reactant, employed herein to esterify the carboxyl-containing phenol-aldehyde resin, have a molecular weight not exceeding 25,000.

COMPOUNDS CONTAINING NITROGEN

These intermediates of the invention are those wherein the acylation-susceptible reactant contains nitrogen, and particularly nitrogen in connection with carbon and hydrogen, or carbon, hydrogen and oxygen, and are prepared by reaction of the carboxyl-containing resin with a nitrogen compound of specified character, as described below.

Nitrogen-containing compounds which are reactive towards the carboxyl group can be divided into various classes as to their structure. Reactivity towards a carboxyl radical generally means the presence in them of either an amino nitrogen atom or an alkanol radical or the equivalent, that is, hydrogen attached to oxygen. The inorganic nitrogen compounds include ammonia, hydrazine, etc. The organic nitrogen compounds include amines, such as primary, secondary and tertiary amines, polyamines as well as monoamines, amines containing alkanol radicals or the equivalent, and amines which contain both a reactive hydrogen atom attached to oxygen and one or more reactive hydrogen atoms attached to nitrogen. For purposes of convenience the nitrogen-containing compounds employable as reactants here are divided into the following classes:

*Class 1.*—Compounds containing only 1 nitrogen atom per molecule, with at least 1 reactive hydrogen atom attached hereto, but in the absence of reactive hydroxyl groups. Ammonia and hydrazine are examples of inorganic compounds of this class. Primary amines like ethylamine, isopropylamine, butylamine, amylamine, hexylamine, heptylamine, octylamine, decylamine, tetradecylamine, hexadecylamine, and octadecylamine are members of the class. High molal primary amines, like those sold by Armour & Company, Chicago, as "Armeens," usually with a figure designation showing the numbers of C atoms in the alkyl radical, e. g., "Armeen 10," "Armeen 12," "Armeen 16," etc., are included. So are secondary amines like diethylamine, dipropylamine, dibutylamine, diamylamine, dihexylamine, dioctylamine, etc. Also included are aniline, cyclohexylamine, bis-(dimethylbutyl)-amine, 1-3-dimethylbutylamine, 2-amyl-4-methyl pentane. Amides are also included in this class, but are commonly not attractive for use here because of the difficulty of securing satisfactory reaction to produce secondary amides. Other useful amines of this class will be suggested by the above-recited list.

*Class 2.*—Compounds containing only 1 nitrogen atom per molecule, but in which a hydroxyl group is the only reactive and functional group, as here employed. In this class are tertiary alkanolamines like diethylethanolamine, dimethylethanolamine, triethanolamine, diethylpropanolamine, methyldiethanolamine, ethyldipropanolamine, phenyldiethanolamine, etc. The products obtained by reacting such amines with alkylene oxides like ethylene oxide or propylene oxide are also useful, e. g., triethanolamine may be reacted with ethylene- or propylene oxide. Alkyl primary amines, particularly those in which the alkyl group originates in fatty materials and contains from about 10 to about 18 carbon atoms, may be treated with such alkylene oxides to produce useful nitrogen compounds of the generic formula, R—di(AlkO)$_n$H—N. Similarly, amides of the generic formula RCONH$_2$, may be oxyalkylated to produce compounds of the generic formula,

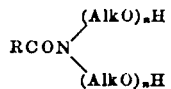

The ricinoleyl amides of dialkylamines are also examples of this class. Other examples of similarly useful reactants of this class will be suggested by the above list.

*Class 3.*—Compounds containing only 1 nitrogen atom per molecule and having, in addition to at least 1 reactive hydrogen atom attached thereto, also at least 1 reactive hydroxyl group. In this class are included monoethanolamine, diethanolamine, monopropanolamine, di-propanolamine, ethylethanolamine, propylethanolamine, ethylpropanolamine, phenylethanolamine, 2-amino-2-methyl-1-propanol, 4-amino-4-methyl-2-pentanol, 4 - amino - 2 - butanol 1 - dimethylamino-2-propanol, 5-isopropylamino-1-pentanol, etc. The high-molal monocarboxy acid amides of monoalkanolamines are also examples of this class. Obvious equivalents will be suggested by the above list.

*Class 4.*—Esters of tertiary alkanolamines having only 1 nitrogen atom per molecule, to which nitrogen atom there are attached no reactive hydrogen atoms, but in which ester molecule there is at least 1 reactive hydroxyl radical, either attached to the nitrogen atom through a suitable divalent radical or else as a part of the acyl radical present in said ester. The acyl radicals are those found in monocarboxy acids having 8 C atoms or more. Examples of this class of nitrogen compound are the esters produced from oleic acid and ethyldiethanolamine or from ricinoleic acid and diethylethanolamine. In the case of the above oleic ester, esterification consumes only one of the two hydroxyl groups originally present in that alkanolamine, leaving one such reactive hydroxyl group in the ester, for use for the present purpose. In the case of the ricinoleic ester above, esterification consumes the only hydroxyl group originally present in the alkanolamine there used; but the ricinoleic radical itself contains a reactive hydroxyl group, and the ester is therefore still reactive for the present purpose. In preparing the compounds of this kind, there may be employed only as many acyl radicals as there are alkanol radicals, less one; except that, if the acyl radical itself retains at least one reactive hydroxyl group after esterification, then one may use as many acyl radicals as there are alkanol radicals. Examples of suitable alkanolamines have already been recited under Class 2 above; but some of the examples there recited will not serve here in all cases because they contain only one reactive hydroxyl group and this is destroyed in esterification. If ricinoleic acid is the acylating reactant, all those recited there are useful here. It is apparent from the foregoing description that the intent is to retain at least one reactive hydroxyl group in the ester prepared from the tertiary alkanolamine and the acylating reactant employed.

Class 5.—Compounds which are non-resinous, which contain more than 1 nitrogen atom per molecule, and which contain no acyl group. Examples include the alkylene polyamines like ethylenediamine, diethylenetriamine, triethylenetetramine, tetraethylenepentamine, propylenediamine, dipropylenetriamine, etc. These alkylene polyamines may be treated with an alkylene oxide like ethylene oxide or propylene oxide to produce derivatives which are also useful here, such as hydroxyethyletnylenediamine, tetraethanoltetraethylenepentamine, etc. Oxyalkylation may be continued, of course, until a considerable number of alkyleneoxy groups have been introduced, without adversely affecting the utility of such derivatives here. Imidazolines, both mono-imidazolines and di-imidazolines, are included in this present class. Such compounds may be prepared by reacting, under sufficiently severe conditions, a monocarboxylated acid and an alkylenepolyamine. For example, when oleic acid and tetraethylenepentamine are reacted in molar proportions at a temperature somewhat exceeding 200° C. amidification first occurs, with the elimination of 1 mole of water. On continued heating, especially at temperatures approaching 300° C., a second molecule of water is split out, the acyl group becomes an alkyl group, the imidazoline ring is formed, and the product is the monooleyl imidazoline of tetraethylenepentamine. If the proportion of fatty acid is doubled, a dioleyl imidazoline is produced, instead. Examples of such mono- and di-imidazolines are recited and described in U. S. Patents Nos. 2,466,517 and 2,468,163, dated April 5, 1949, and April 26, 1949, respectively, to Blair and Gross. Furthermore, U. S. Patent No. 2,369,818, dated February 20, 1945, to De Groote and Keiser, illustrates the fact that such imidazolines may be subjected to reaction with an alkylene oxide like ethylene oxide, to produce oxyalkylated derivatives thereof which are useful here.

Other examples of suitable reactants of the present class include 3-diethylaminopropylamine, 1-3-diaminobutane, triglycoldiamine, and the compound, $NH_2(CH_2)_3O(CH_2)_6O(CH_2)_3NH_2$. See also the co-pending case of one of us, Serial No. 107,381, filed July 28, 1949, now Patent 2,552,530, issued May 15, 1951, for additional examples of suitable nitrogen compounds of this class.

Class 6.—Compounds containing more than 1 basic nitrogen atom per molecule, and which also contain at least one high molal acyl group. The amides produced from monocarboxy acids like the fatty acids and alkylene polyamines like tetraethylenepentamine, and referred to in Class 5 above as being intermediates formed in the preparation of certain imidazolines, are representative of this class. For example, if one reacts 1 mole of oleic acid with 1 mole of tetraethylenepentamine until 1 mole of water of reaction is removed, the product is an amide of the present class. Stearic acid or tall oil or other detergent-forming acid having at least 8 C atoms may be substituted for oleic acid in producing such an amide, with equally satisfactory results. Other alkylene polyamines such as ethylenediamine, diethylenetriamine, triethylenetetramine, etc., may be substituted for tetraethylenepentamine in the examples just discussed, to produce desirable amides. Or such polyamine may be oxyalkylated prior to use in the amidification reaction, using ethylene oxide or propylene oxide. If imidazolines of the kind included in Class 5, immediately above, are acylated, such acylated imidazolines are then properly included in the present class of nitrogen compounds. Other useful examples of nitrogen compounds of the present class are described in U. S. Patent No. 2,243,329, dated May 27, 1940, to De Groote and Blair.

Of all the members of this sixth class of nitrogen compounds, we prefer to employ as reactants here a type of product which is related to the esters of class 4 above. If, instead of using molal proportions of high molal monocarboxy acid having 8 carbon atoms or more and of tertiary alkanolamine, as in the preparation of materials of Class 4, above, one employs 2 or more moles of alkanolamine for every mole of monocarboxy acid, desirable reactants of the present class are formed. These may be termed acylated polyaminoalcohols. To describe more precisely this particular and preferred type of Class 6 nitrogen compound, the following statement is made:

The compounds are acylated derivatives of a basic polyaminoalcohol of the formula:

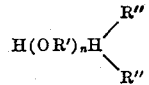

said acylated derivatives thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10; and RCO is a substituent for a hydroxyl hydrogen atom.

In the foregoing formula, R' may, in some of its multiple occurrences in the molecule, represent the same alkylene radical or it may represent different alkylene radicals, so long as each R contains from 2 to 10 carbon atoms. For example, oxyethylated oxypropylated triethanolamine would contain some R' radicals which are $C_2H_4$ radicals, and others which are $C_3H_7$ radicals.

Further description of this acylated polyamino-alcohol reactant will be found, for example, in U. S. Patent No. 2,470,829, dated May 24, 1949, to Monson. As a specific example of this preferred class of nitrogen compound, a passage from said Monson patent will be recited later below, in this application.

It is to be understood that isomeric forms of the nitrogenous compounds of all 6 classes above may be employed instead of the forms referred to above, without departing from the invention.

The acylation products which constitute the intermediates here described are prepared by reacting a member of the class of carboxyl-containing, xylene-soluble, water-insoluble, acid-catalyzed, low-stage, phenol-aldehyde resins with a member of one of the classes of nitrogen compounds just recited above.

Although the reactions involved here may be ammonolysis, esterification, or amidification reactions, they involve the introduction, into the nitrogen compound, of an organic acyl radical; hence the reactions are all properly termed acylation reactions, and the products are acylation products.

The following examples will illustrate this acylation reaction and preparation of such acylated intermediates.

For convenience, we have used a conventional two-piece laboratory resin pot. The cover part of the equipment had four openings: One for reflux condenser; one for stirring device; one for a separatory funnel or other means of adding reactants; and a thermometer well. In the manipulation employed, the separatory funnel insert for adding reactants was not used. The device was equipped with a combination reflux and water-trap apparatus so that the single piece of apparatus could be used as either a reflux condenser or a water trap, depending on the position of the three-way glass stopcock. This permitted convenient withdrawal of water from the water trap. The equipment, furthermore, permitted any setting of the valve without disconnecting the equipment. The resin pot was heated with a glass fiber electrical heater constructed to fit snugly around the resin pot. Such heaters, with regulators, are readily available.

The selected carboxyl-containing resin, either dissolved in xylene or with xylene added, was placed in the resin pot, along with the appropriate other reactant. In the event that the other reactant was non-basic, such as a hydroxylated amide, a small amount of catalyst, usually paratoluene sulfonic acid, was added. When the other reactant was basic, as in the case of triethanolamine, usually no catalyst was added. The mixture was refluxed and stirred during the entire procedure.

When the phase-separating trap showed that the amount of water separated was approximately that expected from the reaction, the operation was stopped. The intermediate so obtained was, of course, dissolved in xylene. The xylene was readily removable by vacuum distillation although for subsequent reaction with an alkylene oxide there is no objection to its presence. The following examples illustrate the process:

Example 106b

The carboxyl-containing resin of Example 7a of application S. N. 137,293, in which the ratio of amyl phenol to salicylic acid in the original reaction mass was 4:1, was mixed (228 grams) with 38.9 grams of commercial triethanolamine and 222 grams of xylene. In this mixture the ratio of COOH radical to amine was 1:1. A catalyst, para-toluene sulfonic acid (5 grams), was added and the mass was refluxed at approximately 145° C., in a conventional glass laboratory resin pot assembly, just described. After approximately 7 hours, the theoretical volume of water had been collected and the operation was stopped. The product, which was a dark-brown, brittle solid, somewhat water-dispersible, was the ester of the carboxyl-containing resin.

In similar fashion, several carboxyl-containing resins of the kind above described were reacted with nitrogen compounds of the various classes just recited, to produce the desired acylation products or intermediates. These examples are not set out here in the detail accorded Example 106b above; but are condensed into the following table. It is to be understood that the procedure is in general that of Example 106b. Details of each of such preparations, including the nature of the resin and the nitrogen body employed, the amount of each, the amount of xylene present, the amount of catalyst (paratoluene sulfonic acid) employed, if any, the molal ratio of carboxyl radical, COOH, to nitrogen body, the temperature of the reaction mass during processing, the time of processing, the amount of water evolved, are all set out in the table. The product was in all cases a dark-brown, brittle solid. In all instances except in Example 125b, it was water-dispersible.

| Ex. No. | Resin[1] of Ex. No. | Amt. (g.) | Nitrogen Compound | Amt. (g.) | Xylene (g.) | Catalyst (g.) | Ratio, COOH: N Body | Temp., °C | Time, Hrs. | Water Out |
|---|---|---|---|---|---|---|---|---|---|---|
| 106b | 7a | 228 | Triethanolamine | 38.9 | 222 | 5 | 1:1 | 145 | 7 | Theory. |
| 107b | 7a | 228 | Diethanolamine | 27.4 | 222 | 5 | 1:1 | 147 | 7 | Do. |
| 108b | 7a | 228 | Dipropanolamine | 34.7 | 222 | 5 | 1:1 | 152 | 7 | Do. |
| 109b | 9a | 200 | Diethylenetriamine | 25.2 | 200 | | 1:1 | 145 | 7 | Do. |
| 110b | 9a | 200 | Armeen 10 | 45.3 | 200 | | 1:1 | 150 | 5 | Do. |
| 111b | 9a | 200 | Armeen 12d | 46.8 | 200 | | 1:1 | 150 | 6 | Do. |
| 112b | 9a | 200 | Armeen 16d | 61.7 | 200 | | 1:1 | 150 | 5 | Do. |
| 113b | 9a | 200 | Armeen HTD | 66.6 | 200 | | 1:1 | 150 | 5 | Do. |
| 114b | 9a | 200 | Armeen 18D | 67.6 | 200 | | 1:1 | 150 | 5 | Do. |
| 115b | 9a | 200 | Armeen CD (Coco) | 50.5 | 200 | | 1:1 | 150 | 5 | Do. |
| 116b | 9a | 200 | Isopropanolamine | 18.4 | 200 | | 1:1 | 145 | 5 | Do. |
| 117b | 9a | 200 | Hydroxyethyl-ethylenediamine | 25.5 | 200 | | 1:1 | 147 | 6 | Do. |
| 118b | 9a | 200 | Dipropylenetriamine | 32.1 | 200 | | 1:1 | 147 | 5 | Do. |
| 119b | 9a | 200 | 2-amino-2-methyl-l-propanol | 21.8 | 200 | | 1:1 | 149 | 5 | Do. |
| 120b | 9a | 200 | Diethanolamine | 25.8 | 200 | | 1:1 | 152 | 5 | Do. |
| 121b | 9a | 200 | Armeen TC | 107 | 200 | | 1:1 | 152 | 6 | Do. |
| 122b | 9a | 200 | Armeen 2HT | 128 | 200 | | 1:1 | 152 | 6 | Do. |
| 123b | 9a | 200 | Di-n-butylamine | 31.8 | 200 | | 1:1 | 147 | 6 | Do. |
| 124b | 9a | 200 | 2-amino-4-methyl-pentane | 24.7 | 200 | | 1:1 | 145 | 6 | Do. |
| 125b | 9a | 200 | n-Decylamine | 38.5 | 200 | | 1:1 | 145 | 5 | Do. |
| 126b | 7a | 428 | Dimethylethanolamine | 44.5 | 303 | | 1:1 | 150 | 8 | Do. |
| 127b | 9a | 450 | ...do... | 50 | 320 | | 1:1 | 150 | 8 | Do. |
| 128b | 9a | 269 | Diethylethanolamine | 39.5 | 291 | | 1:1 | 150 | 8 | Do. |
| 129b | 8a | 291 | ...do... | 30.2 | 178 | | 1:1 | 150 | 8 | Do. |
| 130b | 11a | 283 | ...do... | 30.8 | 286 | | 1:1 | 150 | 8 | Do. |

[1] Example number is that of S. N. 137,293.

Note: The "Armeens" are high molal primary amines prepared in most cases from fatty materials, and are supplied commercially by Armour & Co., Chicago. See their catalog entitled "Armeens" for further description of them.

Example 131b

One mole of tetraethylenepentamine was oxyalkylated with ethylene oxide until 7 moles thereof had been absorbed, using the conventional procedure described above. This operation consumed 20 minutes, at a temperature of 165° C. and maximum pressure of 70 p. s. i. This product was then esterified with 1 mole of ricinoleic acid, using no catalyst and continuing heating at 240–250° C., for 1.5 hours, distilling off 1 mole of water of esterification, in that time. This esterification product was then acylated by reacting it with a carboxyl-containing phenol-aldehyde resin, as follows: Use 177 grams of the just-prepared acylation product and 189 grams of the resin of Example 7a of application S. N. 137,293, plus 234 grams of xylene. No catalyst was required. The reaction mass was refluxed with stirring for a total of 8 hours, the temperature being 150° C., during which time a theoretical amount of water was distilled off. The xylene-free product was a dark-brown, brittle solid.

Example 132b

One-half mole of triethylenetetramine and 0.5 mol. of tall oil was reacted to produce an amide, the reaction being conducted over a time of 7 hours, with the temperature at 200° C. for 5.5 hours, and finally at 240° C. for 1.5 hours. A total of 9 ml. of water was distilled off and collected in this time. The amide so produced was reacted with the resin of Example 7a of application S. N. 137,293, using 140 grams of amide, 265 grams of resin, 288 grams xylene, no catalyst. The temperature was held at 150° for 8 hours of heating, stirring, and refluxing, the water of reaction being distilled off. The resulting acylation product was a dark-brown, brittle solid.

Example 133b

An amide was prepared from tall oil and tetraethylenepentamine, using 0.5 mol. of each reactant. After heating 2 hours at 240° C., about 10 ml. of water had distilled. The amide was acylated using the carboxyl-containing resin of Example 9a of application S. N. 137,293. To do this, use 132 grams of the amide just prepared, 214 grams of the carboxyl-containing resin, 373 grams xylene, no catalyst. The temperature was 150° C. during heating and stirring with refluxing, which proceeded over 8 hours' time. Water of reaction was distilled, leaving a xylene solution of the desired acylation product. Said product, in absence of the solvent, was a red-brown, brittle solid.

Example 134b

Prepare the mono-ester of tall oil and triethanolamine by heating 1 mole of each for 240–250° C. for 1.5 hours. Mix 125 grams of said ester, 219 grams of the carboxyl-containing phenolaldehyde resin of Example 9a of application S. N. 137,293, and 255 grams xylene in the conventional resin pot, adding no catalyst. Reflux with stirring, at 150° C., for 8 hours, distilling off the water of reaction. The resulting acylation product, xylene-free, is a red-brown, brittle solid.

Example 135b

Prepare the reaction product of ricinoleic acid and diethylethanolamine by employing molal proportions of these reactants, and heating at 240–250° C. for 1.5 hours. The resulting product still retains the OH group in the ricinoleic acid residue present. React this product with the carboxyl-containing phenol-aldehyde resin of Example 9a of application S. N. 137,293 by refluxing, with stirring, 117 grams of the amine product, 224 grams of the resin, 259 grams xylene, without a catalyst, for 8 hours, distilling off the water of reaction. The product, xylene-free, is a red-brown, brittle solid.

Example 136b

Prepare an oxyethylated product from triethanolamine by introducing 3 moles of ethylene oxide per mole of triethanolamine, in a conventional oxyalkylation procedure, already described, no catalyst being required. Time required was 15 minutes; maximum temperature, 150° C., maximum pressure 60 p. s. i. The oxyalkylated triethanolamine, 85.5 grams, is mixed with the carboxyl-containing phenol-aldehyde resin of Example 9a of application S. N. 137,293, 242 grams, and xylene, 272 grams, no catalyst being added. Stir and reflux at 150° C. for 8 hours, distilling off the water of reaction. The xylene-free product is a red-brown, brittle solid.

Example 137b

Oxypropylate triethanolamine, using 3.46 moles of propylene oxide per mole of triethanolamine, in the conventional oxyalkylation procedure described above, no catalyst being required. Time required was 8 hours, maximum temperature, 165° C., maximum pressure, 200 p. s. i. React 102 grams of this product with 233 grams of the carboxyl-containing phenol-aldehyde resin of Example 9a of application S. N. 137,293, in the presence of 265 grams xylene, but no catalyst. After 8 hours of stirring and refluxing at 150° C., distill off the water of reaction. The product, solvent-free, is a dark-brown, brittle solid.

Example 138b

Oxyalkylate 1 mole of triethanolamine, using 3.46 moles of propylene oxide as in Example 137b above, the reaction requiring 8 hours at a maximum temperature of 165° C. and a maximum pressure of 200 p. s. i., and subsequently introducing 2.97 moles ethylene oxide into said oxypropylated amine, in 30 minutes, maximum temperature 160° C., maximum pressure 170 p. s. i. Thereafter, react the oxylated amine, 130 grams, with the carboxyl-containing phenol-aldehyde resin of Example 9a of application S. N. 137,293, 216 grams, xylene, 254 grams, but no catalyst. Stir and reflux 8 hours at 150° C., distilling off the water of reaction. The product, solvent-free, is a red-brown, brittle solid.

Example 139b

React 0.5 mole of stearic acid and 0.5 mole of tetraethylenepentamine for 4.75 hours at 240° C., recovering 9 ml. water in the operation. React 190 grams of the amino product with 426 grams of the carboxyl-containing phenol-aldehyde resin of Example 12a of application S. N. 137,293, adding 474 grams xylene, but no catalyst to the mixture. Stir and reflux 8 hours, distilling off the water of reaction. The solvent-free product is a dark-brown, brittle solid.

In preparing acylation product intermediates from a nitrogen body selected from Classes 1 to 6 above, and a carboxyl-containing phenol-aldehyde resin, we prefer to employ a nitrogen body selected from that sub-group of Class 6 which are acylated derivatives of basic polyaminoalcohols.

This particular sub-group of nitrogen compounds which are included in the above-described Class 6 are esters of tertiary alkanolamines having more than 1 nitrogen atom per molecule. They have also at least 1 acyl group per molecule said acyl group being a higher molal group, having at least 8 C atoms. Their molecule contains at least 1 reactive hydroxyl radical, either attached to nitrogen through a suitable divalent radical or else as a part of the acyl radical. These nitrogen-containing esters are not to be confused with a closely allied group classified in Class 4 above; they differ in being poly-amino, in the present case, whereas said Class 4 compounds are all mono-amino.

The presently employed nitrogenous esters may most conveniently be produced by reaction between a detergent-forming mono-carboxy acid having from 8 to 32 carbon atoms, or its glyceride or other ester, and a tertiary alkanolamine. For example, oleic acid and triethanolamine react to produce a very desirable example of the present class of nitrogen body. In such reaction, there must be present at least 2 moles of the tertiary alkanolamine for each acyl radical present, else the product is at least in part a mono-amine of Class 4, as above stated. Usually, the acyl-containing reactant used to prepare the present acylated polyaminoalcohol does not itself contain a hydroxyl group. In such cases, reaction must be effected between such non-hydroxylated-acyl-containing reactant and a tertiary alkanolamine containing at least 2 reactive hydroxyl groups; so that, after formation of the ester there will remain at least 1 reactive hydroxyl group to accomplish reaction with the carboxyl-containing resin and to produce the acylated intermediate from which our final oxyalkylated product is to be derived.

To illustrate this: If ethyldiethanolamine is etherized by heating to a temperature sufficiently high to drive off a mole of water from 2 moles of the amine, the resulting polyamine contains 2 reactive hydroxyl groups, the other two having been destroyed in the etherization process. If one of the remaining two hydroxyl groups is esterified with oleic acid, there remains in the final product one OH group suitable for combination with the COOH group of the carboxyl-containing resin reactant. Such an acylated polyaminoalcohol therefore qualifies here.

However, if etherization had been effected between one mole of ethyldiethanolamine and one mole of diethylethanolamine, two of the three OH groups originally present would have been consumed. The third OH group would be consumed in the esterification of the oleic acid; and there would have been no residual OH group or groups available for reaction with the carboxyl-containing resin reactant. In such case, use of ricinoleic acid instead of oleic acid would have resulted in an acceptable final polyamino product, since the acyl group of ricinoleic acid itself contains a reactive hydroxyl group and this would have been available for reaction of the acylated polyaminoalcohol with the carboxyl-containing resin.

Therefore, in preparing acylated polyaminoalcohols of the desired class, one must bear in mind that such product must in all cases retain at least one OH group capable of reacting with the COOH group of the carboxyl-containing resin.

In other words, if the basic polyaminoalcohol, before acylation, be represented by the formula

wherein R' is usually selected from the class of ethylene, propylene, butylene, hydroxypropylene, and hydroxybutylene radicals, and R" is, in at least one instance, a nitrogen-containing radical, then at least one R" radical must contain an OH group, so that there are present in said polyaminoalcohol, before its acylation, at least 2 reactive OH groups; and, after acylation, it will still retain at least one OH group. Different occurrences of R' in a single molecule may, of course, represent different alkylene radicals or they may represent the same alkylene radical.

Oxyalkylation of the alkylene polyamines, to introduce OH groups thereinto, produces polyaminoalcohols suitable for acylation here. As above stated, such oxyalkylated alkylene polyamines must contain a minimum of two OH groups before acylation with the high molal detergent-forming mono-carboxy acid or equivalent, so that a minimum of one OH is found in the finally prepared acylated nitrogen body; unless said detergent-forming acid's acyl group itself contains one or more OH groups, as in the case of ricinoleic acid, hydroxystearic acid, dihydroxystearic acid, etc.

The preparation of suitable acylated polyaminoalcohols is not novel with us here. It has been disclosed in numerous patents, including the following: U. S. Patents Nos. 2,324,488 and 2,324,490, both dated July 20, 1943, to De Groote and Keiser; 2,259,704, dated October 21, 1941, to Monson and Anderson; 2,306,329, dated December 22, 1942, to De Groote, Keiser, and Blair.

Examples of the preparation of acylated polyaminoalcohols include the following:

One mole of ricinoleic acid is heated with 3 moles of triethanolamine at approximately 250° C. for 6 hours. The product is an acylated polyaminoalcohol.

One mole of castor oil is substituted for ricinoleic acid and 9 moles of triethanolamine are employed instead of 3, above. The product closely resembles that of the first example above.

Oleic acid may be substituted for ricinoleic acid or castor oil. Tall oil, which is principally a mixture of oleic and rosin acids, may be substituted for the fatty acids. Different proportions of triethanolamine may be used, so long as at least 2 moles of triethanolamine are present for every acyl radical present.

As a preferred procedure for preparing an acylated polyaminoalcohol for the present purpose, the following is given, substantially as it appears in U. S. Patent 2,470,829, dated May 24, 1949, to Monson:

A mixture of diamino and triamino materials is prepared (by heating triethanolamine) which correspond essentially to the two following type forms:

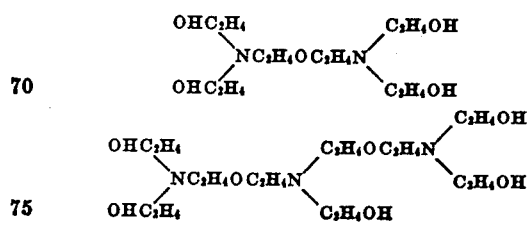

After determining the average molecular weight of such mixture, it is combined with castor oil in the proportion of 1 pound mole of castor oil for 3 pound moles of the mixed amines, "pound mole" in the latter case being calculated on the average molecular weight, as determined. Such mixture is heated to approximately 160–260° C. for approximately 6 to 25 hours, until reaction is complete, as indicated by the disappearance of all of the triricinolein present in the castor oil.

*Example 140b*

Prepare a polyamino product from 925 grams of castor oil and 1090 grams triethanolamine, by heating at least 2 hours at a temperature of 250° C., and preferably 6 hours or even longer. The product contains approximately 2.5 triethanolamine residues per ricinoleic residue. Use 137 grams of it, 213 grams of the carboxyl-containing phenol-aldehyde resin of Example 19a of application S. N. 137,293, and 250 grams xylene, but no catalyst, to produce an acylation product of said amino material. Reaction is conducted by stirring with reflux for 8 hours at 150° C. and distilling off the water of reaction. The product is a dark-brown, brittle solid.

*Example 141b*

Produce a derivative of triethanolamine by reacting 885 grams soybean oil with 1090 grams triethanolamine for 6 hours at 250° C. React 137 grams of the product with 209 grams of the carboxyl-containing phenol-aldehyde resin of Example 20a of application S. N. 137,293, adding 254 grams xylene but no catalyst in the reaction. Reflux and stir 8 hours at 150° C., distilling off the water of reaction. The product, when solvent-free, is a dark-brown, brittle solid.

*Example 142b*

React 900 grams of tall oil with 2,180 grams of triethanolamine for 6 hours at 250° C. Thereafter mix 140 grams of this product with 112 grams of the carboxyl-containing phenol-aldehyde resin of Example 9a of application S. N. 137,293, and 348 grams xylene, but no catalyst. Reflux the mixture, with stirring, for 8 hours, distilling off the water of reaction. The product was not freed of solvent; but was used in xylene solution in the preparation of oxyalkylated derivatives.

In the preparation of acylated intermediates from nitrogen-containing acylation-susceptible reactants and carboxyl-containing phenol-aldehyde resins we prefer that said nitrogenous acylation-susceptible reactants have a molecular weight not exceeding 25,000.

COMPOUNDS CONTAINING CHLORINE OR SULFUR

These intermediates of the invention are those in which a carboxyl-containing phenolaldehyde resin is reacted with an organic acylation-susceptible reactant which contains chlorine or sulfur atoms or both in its molecule. In addition to carbon and hydrogen, oxygen or nitrogen, or both, may be present in such reactant.

Examples of chlorine-containing acylation-susceptible reactants usable here include chlorinated lower glycerides, like dichloromonostearin or dichlorodistearin, produced by the chlorination of oleic acid to form dichlorostearic acid, and the subsequent reaction thereof with an excess of glycerol. If desired, the dichlorostearic acid may be esterified in molar proportions with a polyhydric alcohol to produce a fractional ester containing chlorine; or such halogenated acid may be reacted with an alkylene oxide like ethyelne oxide to produce such a fractional ester.

Cardanol is a substituted phenol derived from cashew nutshell oil, and contains an ethylenic side chain having 14 carbon atoms or more. It may be subjected to mild chlorination, to introduce chlorine into such unsaturated side chain. See U. S. Patent No. 2,368,709, dated February 6, 1945, to Harvey. To produce a suitable acylation-susceptible reactant from such chlorinated cardanol, one may subject it to oxyalkylation; or one may form a phenol-aldehyde resin from said chlorinated cardanol and an aldehyde like formaldehyde, and subsequently oxyalkylate said resin. Either oxyalkylated derivative is usable here. See our co-pending application, Serial No. 8,722, filed February 16, 1948, now Patent 2,499,365, granted March 7, 1950, where Example 258a relates to the production of a resin from cardanol and formaldehyde and Example 17b describes production of the oxyethylated derivative thereof. The same procedure may be employed to produce a similar resin from chlorinated cardanol and formaldehyde, and the oxyalkylated derivative thereof, respectively.

A chlorinated phenol, like para-chlorophenol, may be oxyalkylated to produce a chlorine-containing, acylation-susceptible product which is usable as a reactant here. If desired, p-chlorophenol, for example, may be converted into a resin by reaction with an aldehyde, and said chlorine-containing phenol-aldehyde resin may be oxalkylated to produce a reactant suitable for the present purpose. See Example 203a of our co-pending application, Serial No. 8,722, filed February 16, 1948, for details of preparing such a resin.

Epichlorohydrin is a useful tool for introducing the chlorine atom into molecules which originally contain a reactive hydrogen atom or other reactive element capable of reacting with such epichlorohydrin. Such reactions are well-known and are not described here.

Where an alkylene oxide like ethylene oxide is employed to produce an acylation-susceptible derivative of a chlorine-containing material, it is often desirable to employ stannic chloride as a catalyst in the reaction, rather than the otherwise more commonly employed alkaline catalysts, like caustic soda. The reason is that such alkaline catalysts tend to de-chlorinate the halogenated reactant under the conditions which maintain during oxyalkylation, and this eliminates or destroys the catalyst.

Ethylene chlorohydrin and glycerin chlorohydrin are additional examples of usable chlorine-containing acylation-susceptible reactants.

Sulfur-containing acylation-susceptible materials include "Vultac," a line of resinous products of Sharples Chemicals, Inc., Philadelphia. This is the trade-mark of a number of sulfur-containing resinous materials, stated by the manufacturer to have the following generic structural formula:

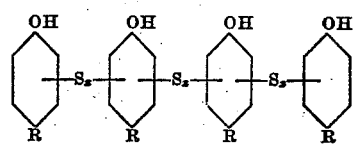

and to contain differing amounts of sulfur. These products, alkylphenol sulfides, may be reacted with alkylene oxides, like ethylene oxide, to produce acylation-susceptible derivatives which are useful here. If desired, they may be reacted with a suitable aldehyde, like formaldehyde, to form resins; and such resins may in turn be oxyalkylated as before, to produce acceptable acylation-susceptible derivatives. See Example 346a of our co-pending application, Serial No. 8,722, filed February 16, 1948, wherein Vultac resins are referred to; and to Example 64b of said co-pending application, wherein the oxyethylation of such Vultac resin is recited.

Santolite MS is the trade-mark of a sulfonamide-formaldehyde resin manufactured by Monsanto Chemical Company, St. Louis. Such sulfur-containing material is referred to in Example 36Sa of our co-pending application, Serial No. 8,722, filed February 16, 1948; and is oxyethylation is described in Example 77b of said co-pending application. The oxyalkylated derivatives of said Santolite MS are usable acylation-susceptible reactants here. The Santolite MS, before oxyalkylation, is not particularly suitable for the present purpose, because of the relative inactivity of the —NH— group.

Other examples of acceptable sulfur-containing reactants of the present type are to be found in U. S. Patent No. 2,355,694, dated July 18, 1944, to De Groote and Keiser; and in U. S. Patent No. 2,345,121, dated March 28, 1944, to Hentrich and Kirstahler. Thiourea-formaldehyde resins may be oxyalkylated; and such oxyalkylated derivatives may be employed for the present purpose.

Sharples Chemicals, Inc., Philadelphia, also offers a polyethyleneglycol tertiary-dodecyl thioether under the trade-mark "Nonic 218" which is an acceptable sulfur-containing reactant of the present type, and which is made from dodecyl thioether by oxyethylation. Other oxyalkylated mercaptans immediately come to mind as obvious equivalents of such product, for the present use.

It is to be understood that the acylation-susceptible reactant may contain both sulfur and chlorine in its molecule, just as the reactant derived from Santolite MS above contains both sulfur and nitrogen. For example, one may employ, instead of the Sharples Vultac resin above, the chlorinated derivative thereof. Alternatively, one may prepare an oxyalkylated derivative of said Vultac resin, as in Example 146b just below; and then introduce chlorine into the molecule by reacting it with epichlorohydrin.

To produce, from a member of the foregoing class of chlorine- or sulfur-containing, acylation-susceptible reactants, an acylation product suitable for use as an intermediate in further reactions, it is only necessary to conduct a conventional reaction, such as an esterification reaction—or, in case the chlorine- or sulfur-containing reactant were without reactive hydroxyl groups, but were, for example, an amide or sulfonamide, an amidification reaction—between such reactant and a carboxyl-containing phenol-aldehyde resin. To illustrate such reactions, the following examples are given.

*Example 143b*

Oxyethylated p-chlorophenol is prepared by reacting the phenol, 128 grams, with ethylene oxide, 88 grams, in an autoclave of the kind fully described above, at a temperature of approximately 170° C., using 100 grams of xylene as a solvent, and 2 grams of stannic chloride to catalyze the reaction. Oxyethylation is readily achieved in a matter of minutes. The product, still in xylene solution, is removed from the autoclave, transferred to a glass resin pot, also adequately described above, and esterified with the carboxyl-containing resin of Example 7a of application S. N. 137,293. Esterification is achieved by stirring and refluxing 154 grams of the solution containing about 50 grams xylene and approximately 109 grams of oxyethylated phenol so prepared, 425 grams of said amylphenol-salicylic acid-formaldehyde resin and 300 grams more of xylene for 4 hours in the presence of 2 grams para-toluene sulfonic acid, and distilling off water of esterification. Approximately the theoretical quantity, 0.5 mole, of water was so recovered. The product is a chlorine-containing acylation product or intermediate.

*Example 144b*

Instead of oxyalkylating p-chlorophenol as in Example 143b just above, prepare a phenol-aldehyde resin from 128 grams of the phenol and 81 grams of 37% formaldehyde, employing conventional resinification procedure. Such resin, as prepared, contained 100 grams of xylene added before resinification; and also 1 or 2 grams of concentrated HCl and of alkylated aromatic sulfonic acid sodium salt employed to promote the resinification reaction. These are not removed from the mass before proceeding to the oxyethylation step. This is conducted by transferring to the autoclave, described above, approximately 137 grams of resin, 100 grams of xylene, 2 grams of resinification catalyst, plus 2 grams of stannic chloride (for oxyethylation catalyst). Ethylene oxide, 88 grams, is then introduced into this resin solution, maximum temperature being about 165° C., and absorption of the ethylene oxide being accomplished in 15 minutes. Approximately 225 grams of the oxyethylated chlorophenol-formaldehyde resin so prepared, in solution in 100 grams xylene, was added to 840 grams of the butylphenol-salicyclic acid-formaldehyde resin of Example 9a of application S. N. 137,293; and 300 grams more xylene were added. The mixture was placed in a conventional glass resin pot, already described, and refluxed with stirring for 5 hours, in the presence of 3 grams p-toluene sulfonic acid. At the end of this time 18 grams of water of reaction, approximately theoretical in amount, had distilled off. The product was a chlorine-containing, acylation product intermediate.

*Example 145b*

Cardanol is chlorinated using the procedure recited in Example 5 of U. S. Patent No. 2,368,709, dated February 6, 1945, to Harvey, until approximately 2 moles of chlorine have been absorbed by each mole of cardanol. The chlorinated cardanol, 500 grams, was mixed with 113 grams 37% formaldehyde, 400 grams xylene, 3 grams concentrated HCl, and 1.5 grams alkylated aromatic sulfonic acid sodium salt, in a glass resin pot, and refluxed 3.5 hours, after which water of reaction was distilled off, the volume being about 25 ml.

A portion of the xylene solution of the resin so formed, adjusted to contain 50% xylene solvent, was introduced into the autoclave already described, a total of 820 grams of such solution containing 410 grams of resin, being used; and 5 grams of stannic chloride were added as catalyst. Subsequently, ethylene oxide, 585 grams, was added in six portions, each of the first five being 90 grams, and the sixth, 135 grams. The additions were absorbed quite readily, the temperatures usually staying below about 160° C., and addition being achieved in a matter of about 30 minutes in each case. The product is a chlorine-containing acylation-susceptible reactant, usable here.

The oxyethylated resin, so produced from chlorinated cardanol-formaldehyde resin, was reacted with the carboxyl-containing phenol-aldehyde resin of Example 7a of application S. N. 137,293. Into a glass resin pot were introduced 350 grams of the cardanol derivative and 395 grams of the butylphenol-salicylic acid-formaldehyde resin, 7 grams p-toluene sulfonic acid, and 500 grams xylene. After stirring with reflux for 6 hours, water of reaction was distilled, its volume being about 18 ml. The product is a chlorine-containing acylation product.

*Example 146b*

Vultac resin, a product manufactured by Sharples Chemicals, Inc., Philadelphia, and consisting of an alkyl-phenol sulfide, as above described, 2,000 grams, was introduced into the autoclave previously described. To it were added 40 grams of sodium methylate and 2,000 grams xylene. Ethylene oxide, 4,000 grams, was introduced into the autoclave in four lots of 1,000 grams each. The time required for absorption of the first lot was 14 hours, at 160° C. The second lot was absorbed in the same time. The third lot was absorbed in 5 hours, at 162° C.; and the fourth lot was absorbed in 4 hours, at 150° C. The product was a sulfur-containing acylation-susceptible reactant, usable here.

It was reacted with the carboxyl-containing resin of Example 7a of application S. N. 137,293, using 400 grams of it and 500 grams of the carboxyl-containing resin in 300 grams xylene. The mixture was stirred and refluxed in a glass resin pot for 6 hours, in the presence of 3 grams paratoluene sulfonic acid, the water of reaction being distilled. About 7 grams of water were so recovered. The product is a sulfur-containing, acylation product, suitable for later use here.

*Example 147b*

Santolite MS, a sulfonamide-aldehyde resin manufactured by Monsanto Chemical Company, St. Louis, was oxyalkylated, as follows: Use Santolite MS, 500 grams; propylene oxide, 66 grams; sodium methylate, 1 gram. Introduce the two reactants and the catalyst into the autoclave previously described and heat for 2.3 hours at a temperature of about 150° C., the pressure reaching 95 p. s. i. No solvent is required here, since the resin is soluble in propylene oxide. Thereafter, approximately 762 grams of ethylene oxide were introduced in 12 portions, as follows: 44 grams in 4 hours, maximum temperature 150° C.; 57 grams, same conditions; 62 grams, 3 hours, 150° C. maximum; 62 grams, same conditions; 81 grams, same conditions; 71 grams plus 1 gram sodium methylate, 3.5 hours, 150° C. maximum; then six 65-gram portions, each requiring about 3 hours to add, with the maximum temperature ranging from about 145° C. to 150° C.

The oxyalkylated Santolite resin, which is a sulfur-containing acylation-susceptible material, was then reacted with the carboxyl-containing phenol-aldehyde resin of Example 9a of application S. N. 137,293. In this reaction, 1230 grams of the oxyalkylated Santolite MS just prepared are mixed with 786 grams of the butylphenol-salicylic acid-formaldehyde resin of said Example 9a, 1,000 grams of xylene, and 20 grams of p-toluene sulfonic acid. The mixture was stirred under reflux for 8 hours, water of reaction being distilled. The product is the desired acylated intermediate.

In the preparation of acylated intermediates from sulfur- or chlorine-containing acylation-susceptible reactants and carboxyl-containing phenol-aldehyde resins we prefer that said acylation-susceptible reactants have a molecular weight not exceeding 25,000.

The oxyalkylation of the intermediates of the present application to prepare products useful for a variety of purposes is outlined above, and in particular for the demulsification of crude petroleum emulsions is described and claimed in our application Serial No. 182,165, filed August 30, 1950.

The demulsification of petroleum emulsions using these oxyalkylated products is described and claimed in our application Serial No. 145,579, filed February 21, 1950, of which the present application is a division.

We claim:

1. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

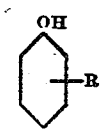

in which R is a hydrocarbon radical having at least 4 and not more than 14 carbon atoms and substituted in one of the positions ortho and para; with (B) an acylation-susceptible reactant composed exclusively of elements selected from the class consisting of carbon, hydrogen, oxygen, nitrogen, sulfur and chlorine, the molecular weight of said reactant not exceeding 25,000, said acylation product being characterized by linkage of said acylation-susceptible reactant to said resin at carboxy groups by reaction at radicals of said acylation-susceptible reactant of the class consisting of carbon-linked hydroxyl groups and nitrogen atoms.

2. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

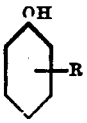

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups.

3. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand; and formaldehyde on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups.

4. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

in which R is a hydrocarbon radical having at least 4 and not more than 14 carbon atoms and substituted in one of the positions ortho and para; with (B) an acylation-susceptible reactant composed of carbon, hydrogen, and oxygen, the molecular weight of said reactant not exceeding 25,000, said acylation product being characterized by linkage of said acylation-susceptible reactant to said resin at carboxy groups by reaction at carbon-linked hydroxyl groups.

5. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

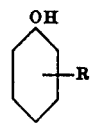

in which R is a hydrocarbon radical having at least 4 and not more than 14 carbon atoms and substituted in one of the positions ortho and para; with (B) an acylation-susceptible reactant which is an oxyalkylated, fusible, organic solvent-soluble, water-insoluble phenol-aldehyde resin; said resin being derived by reaction between a difunctional monohydric phenol and aldehyde having not over 8 carbon atoms and having one functional group reactive toward said phenol; said resin being formed in the substantial absence of phenols of functionality greater than two; said phenol being of the formula

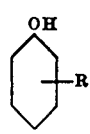

in which R is a hydrocarbon radical having at least 4 and not more than 14 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 50; with the proviso that at least one aliphatic hydroxyl radical be introduced for each resin nucleus, the molecular weight of said reactant not exceeding 25,000, said acylation product being characterized by linkage of said acylation-susceptible reactant to said resin at carboxy groups by reaction at carbon-linked hydroxyl groups.

6. The acylation product obtained by reacting (A) a fusible carboxyl-containing xylene-soluble, water-insoluble, low stage phenol-aldehyde resin; said resin being derived by reaction between a mixture of a di-functional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

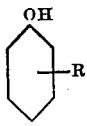

in which R is a hydrocarbon radical having at least 4 and not more than 14 carbon atoms and substituted in one of the positions ortho and para; with (B) hydroxylated water-insoluble esters of mono-carboxy acids composed of carbon, hydrogen and oxygen, said acylation product being characterized by linkage of said water insoluble hydroxylated esters to said resin at carboxy groups by reaction at carbon-linked hydroxyl groups.

7. The acylation product obtained by reacting (A) a fusible carboxyl-containing xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

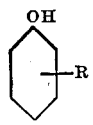

in which R is a hydrocarbon radical having at least 4 and not more than 14 carbon atoms and substituted in one of the positions ortho and para; with (B) a hydroxylated fractional ester of a detergent-forming monocarboxy acid having at least 8 and not more than 22 carbon atoms and a polyhydric alcohol, said ester being composed of carbon, hydrogen and oxygen, said acylation product being characterized by linkage of said fractional ester to said resin at carboxy groups by reaction at carbon-linked hydroxyl groups.

8. The acylation product obtained by reacting (A) a fusible carboxyl-containing, xylene-soluble, water-insoluble, low stage phenol aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

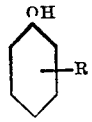

in which R is a hydrocarbon radical having at least 4 and not more than 14 carbon atoms and substituted in one of the positions ortho and para; with (B) an acylation-susceptible reactant composed of carbon, hydrogen, oxygen, and nitrogen, the molecular weight of said reactant not exceeding 25,000, said acylation product being characterized by linkage of said acylation-susceptible reactant to said resin at carboxy groups by reaction at radicals of said acylation-susceptible reactant of the class consisting of carbon-linked hydroxyl groups and nitrogen atoms.

9. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

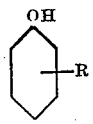

in which R is a hydrocarbon radical having at least 4 and not more than 14 carbon atoms and substituted in one of the positions ortho and para; with (B) an acylation susceptible reactant composed of carbon, hydrogen, oxygen, and nitrogen, the molecular weight of said reactant not exceeding 25,000, said acylation product being characterized by linkage of said acylation-susceptible reactant to said resin at carboxy groups by reaction at a radical of said acylation-susceptible reactant of the class consisting of carbon-linked hydroxyl groups and nitrogen atoms.

10. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

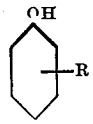

in which R is a hydrocarbon radical having at least 4 and not more than 14 carbon atoms and substituted in one of the positions ortho and para; with (B) an acylation-susceptible reactant composed of carbon, hydrogen, oxygen, and nitrogen, the molecular weight of said reactant not exceeding 25,000 said acylation product being characterized by linkage of said acylation-susceptible reactant to said resin at carboxy groups by reaction at a radical of said acylation-susceptible reactant of the class consisting of carbon-linked hydroxyl groups and nitrogen atoms.

11. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

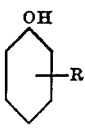

in which R is a hydrocarbon radical having at least 4 and not more than 14 carbon atoms and substituted in one of the positions ortho and para; with (B) an acylation-susceptible reactant which is an acylated derivative of a basic polyamino-alcohol of the formula

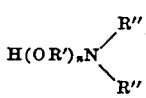

said acylated derivative thereof being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of aminoalkanol radicals and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkylene-oxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; $n$ is a small whole number varying from 1 to 10, RCO is a substituent for a hydroxyl hydrogen atom; the molecular weight of said reactant not exceeding 25,000, said acylation product being characterized by linkage of said acylation-susceptible reactant to said resin at carboxy groups by reaction at carbon-linked hydroxyl groups.

12. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the ratio of 3 to 5 moles of phenol to 1 mole of salicylic acid; said resin being formed in the substantial absence of phenols of functionality greater than two and said phenol being of the formula

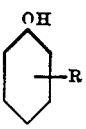

in which R is a hydrocarbon radical having at least 4 and not more than 14 carbon atoms and substituted in one of the positions ortho and para; with (B) an organic nitrogen-containing compound characterized by the presence of one nitrogen atom only per molecule, with the proviso that the remaining elements be carbon, hydrogen, and oxygen, and in which a hydroxyl group is the only acylation-susceptible radical; with the further proviso that the nitrogen-containing reactant be free from any organic radical having more than 32 carbon atoms, the molecular weight of said reactant not exceeding 25,000, said acylation product being characterized by linkage of said nitrogen-containing reactant to said resin at carboxy groups by reaction at carbon-linked hydroxyl groups.

13. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and an aldehyde having not over 8 carbon atoms and one functional group reactive toward both components of the mixture on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

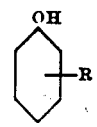

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms.

14. The acylation product obtained by reacting (A) a fusible carboxyl-containing, xylene-soluble, water-insoluble, low stage phenol-aldehyde resin; said resin being derived :- reaction between a mixture of a difunctional monohydric hpdrocarbon-substituted phenol and salicylic acid on the one hand, and formaldehyde on the other hand; the amount of salicylic acid employed in relation to the non-carboxylated phenol being sufficient to contribute at least one salicylic acid radical per resin molecule and the amount of non-carboxylated phenol being sufficient to contribute at least one non-carboxylated phenol radical per resin molecule; said resin being formed in the substantial absence of phenols of functionality greater than two and said phenol being of the formula

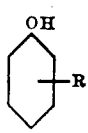

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms.

15. The acylation product obtained by reacting (A) a fusible carboxyl-containing, xylene-soluble, water-insoluble, low stage phenol-aldehyde resin; said resin being derived by reaction between a mixture of a difunctional monohydric hydrocarbon-substituted phenol and salicylic acid on the one hand, and formaldehyde on the other hand; the amount of salicylic acid employed in relation to the non-carboxylated phenol being in the range of 3 to 5 moles of phenol to 1 mole of salicylic acid; said resin being formed in the substantial absence of phenols of functionality greater than two and said phenol being of the formula

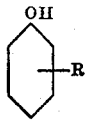

in which R is a hydrocarbon radical having at least 4 and not more than 14 carbon atoms and substituted in one of the positions ortho and para; with (B) a non-acylated polyamine of molecular weight not exceeding 25,000, said acylation product being characterized by linkage of said acylation-susceptible reactant to said resin at carboxy groups by reaction at nitrogen atoms.

MELVIN DE GROOTE.
BERNHARD KEISER.

No references cited.